(12) United States Patent
Miyamoto et al.

(10) Patent No.: US 10,576,369 B2
(45) Date of Patent: Mar. 3, 2020

(54) GAME CONTROLLER

(71) Applicant: FUJITSU LIMITED, Kawasaki-shi, Kanagawa (JP)

(72) Inventors: Akinori Miyamoto, Sagamihara (JP); Yasuhiro Endo, Ebina (JP); Yuichi Kamata, Isehara (JP); Kiyoshi Taninaka, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 701 days.

(21) Appl. No.: 15/227,460

(22) Filed: Aug. 3, 2016

(65) Prior Publication Data

US 2016/0339339 A1 Nov. 24, 2016

Related U.S. Application Data

(63) Continuation of application No. PCT/JP2014/053444, filed on Feb. 14, 2014.

(51) Int. Cl.
*A63F 9/24* (2006.01)
*A63F 13/285* (2014.01)
(Continued)

(52) U.S. Cl.
CPC .......... *A63F 13/285* (2014.09); *A63F 13/211* (2014.09); *A63F 13/214* (2014.09);
(Continued)

(58) Field of Classification Search
CPC ........ G06F 3/016; G06F 3/017; G06F 3/0484; G06F 2203/014; G06F 3/0414
See application file for complete search history.

(56) References Cited

U.S. PATENT DOCUMENTS

2006/0046843 A1 3/2006 Nakajima
2007/0236450 A1* 10/2007 Colgate .................. G06F 3/016
345/156
(Continued)

FOREIGN PATENT DOCUMENTS

JP 6-285259 10/1994
JP 2001-255993 9/2001
(Continued)

OTHER PUBLICATIONS

Japanese Platform for Patent Information, Publication No. 2012-221179, published Nov. 12, 2012.
(Continued)

*Primary Examiner* — Dmitry Suhol
*Assistant Examiner* — Carl V Larsen
(74) *Attorney, Agent, or Firm* — Staas & Halsey LLP

(57) ABSTRACT

A game controller includes a housing; a top panel disposed on an opening portion of the housing and having a manipulation input surface; a position detector configured to detect a position of a manipulation input performed on the manipulation input surface; a vibrating element configured to generate a vibration in the manipulation input surface of the top panel; and a drive controlling part configured to drive the vibrating element by using a driving signal causing the vibrating element to generate a natural vibration in an ultrasound-frequency-band in the manipulation input surface.

5 Claims, 13 Drawing Sheets

(51) Int. Cl.
*A63F 13/426* (2014.01)
*A63F 13/2145* (2014.01)
*G06F 3/0488* (2013.01)
*A63F 13/211* (2014.01)
*A63F 13/214* (2014.01)
*G06F 3/01* (2006.01)
*G06F 3/0354* (2013.01)

(52) U.S. Cl.
CPC ........ *A63F 13/2145* (2014.09); *A63F 13/426* (2014.09); *G06F 3/016* (2013.01); *G06F 3/03547* (2013.01); *G06F 3/0488* (2013.01); *A63F 2300/105* (2013.01); *A63F 2300/1068* (2013.01); *A63F 2300/308* (2013.01)

(56) References Cited

U.S. PATENT DOCUMENTS

| | | | |
|---|---|---|---|
| 2008/0122797 | A1 | 5/2008 | Soh et al. |
| 2009/0102805 | A1 | 4/2009 | Meijer et al. |
| 2009/0284485 | A1* | 11/2009 | Colgate .................. G06F 3/016 345/173 |
| 2010/0022303 | A1 | 1/2010 | Nakajima |
| 2010/0108408 | A1* | 5/2010 | Colgate .................. G06F 3/016 178/18.03 |
| 2010/0231367 | A1* | 9/2010 | Cruz-Hernandez ..... G06F 3/016 340/407.2 |
| 2011/0291976 | A1 | 12/2011 | Takada et al. |
| 2012/0223880 | A1* | 9/2012 | Birnbaum ............... G06F 3/015 345/156 |
| 2012/0229400 | A1 | 9/2012 | Birnbaum et al. |
| 2012/0256858 | A1 | 10/2012 | Sudo |
| 2013/0207904 | A1 | 8/2013 | Short et al. |
| 2014/0139450 | A1* | 5/2014 | Levesque ................ G06F 3/016 345/173 |
| 2014/0267013 | A1* | 9/2014 | Grant .................... G06F 1/1626 345/156 |
| 2015/0355711 | A1* | 12/2015 | Rihn ....................... G06F 3/011 340/407.2 |

FOREIGN PATENT DOCUMENTS

| | | |
|---|---|---|
| JP | 2006-68210 | 3/2006 |
| JP | 2010-231609 | 10/2010 |
| JP | 2010-238222 | 10/2010 |
| JP | 2011-501298 | 1/2011 |
| JP | 2012-27765 | 2/2012 |
| JP | 2012-221179 | 11/2012 |
| JP | 2013-168124 | 8/2013 |

OTHER PUBLICATIONS

Espacenet Bibliographic Data, Japanese Publication No. 2010-238222, published Oct. 21, 2010.
Patent Abstracts of Japan, Publication No. 2012-27765, published Feb. 9, 2012.
Patent Abstracts of Japan, Publication No. 6-285259, published Oct. 11, 1994.
Espacenet Bibliographic Data, Japanese Publication No. 2010-231609, published Oct. 14, 2010.
English Abstract for Japanese Publication No. 2011-501298, published Jan. 6, 2011 from WO 2009/052028 A2 published Apr. 23, 2009.
Patent Abstracts of Japan, Publication No. 2001-255993, published Sep. 21, 2001.
Patent Abstracts of Japan, Publication No. 2006-68210, published Mar. 16, 2006.
Patent Abstracts of Japan, Publication No. 2013-168124, published Aug. 29, 2013.
Dohda et al., "The Printed-matter Typecasting Method for Haptic Feel Design and Sticky-band Illusion", The Collection of Papers of the 11th SICE System Integration Division Annual Conference (SI2010, Sendai), Dec. 2010, pp. 174 to 177.
Nakatani et al., "The Fishbone Tactile Illusion", Collection of papers of the 10th Congress of the Virtual Reality Society of Japan, Sep. 2005 (5 pages).
Nakatani et al., "Convex and Concave Perception Induced by a Fishbone Tactile Illusion", The Virtual Reality Society of Japan Dai 10 Kai Kinen Taikai Ronbun Shorokushu, The Virtual Reality Society of Japan, Sep. 27, 2005, Proceeding of Japan Virtual Reality 2005 pp. 530 to 533.
International Search Report dated May 20, 2014 in corresponding International Application No. PCT/JP2014/053444.
Written Opinion of the International Searching Authority dated May 20, 2014 in corresponding International Application No. PCT/JP2014/053444.

* cited by examiner

FIG.14

| MOVING SPEED | AMPLITUDE VALUE |
|---|---|
| $0 \leq V < b1$ | 0 |
| $b1 \leq V < b2$ | A1 |
| $b2 \leq V < b3$ | A2 |
| | |

GAME CONTROLLER

CROSS-REFERENCE TO RELATED APPLICATION

This application is a continuation application of International Application PCT/JP2014/053444 filed on Feb. 14, 2014 and designated the U.S., the entire contents of which are incorporated herein by reference.

FIELD

The embodiment discussed herein relates to a game controller

BACKGROUND

A tactile sensation producing apparatus is known in the related art which includes a display, a contact detector that detects a contact state of user's manipulation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used to generate the haptic vibration. The tactile sensation producing apparatus further includes an ultrasound modulating means which performs a modulating process on the waveform data, generated by the vibration waveform data generating means, by utilizing ultrasound as a carrier wave and outputs an ultrasound signal generated by the modulating process to the haptic vibration generating means as a signal used to generate the haptic vibration.

The ultrasound modulating means performs either a frequency modulation or a phase modulation. The ultrasound modulating means further performs an amplitude modulation.

However, an ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus does not provide fine tactile sensations during operation by the user. When the tactile sensation producing apparatus is used in a game controller, the operational feeling of the fine tactile sensations is similarly not provided.

RELATED-ART DOCUMENTS

Patent Documents

[Patent Document 1] Japanese Laid-open Patent Publication No. 2010-231609

SUMMARY

According to an aspect of the embodiment, a game controller includes a housing; a top panel disposed on an opening portion of the housing and having a manipulation input surface; a position detector configured to detect a position of a manipulation input performed on the manipulation input surface; a vibrating element configured to generate a vibration in the manipulation input surface of the top panel; and a drive controlling part configured to drive the vibrating element by using a driving signal causing the vibrating element to generate a natural vibration in an ultrasound-frequency-band in the manipulation input surface.

BRIEF DESCRIPTION OF DRAWINGS

FIG. 14 is a diagram illustrating data which represents a relationship between amplitude data representing an amplitude value and a moving speed stored in a memory;

DESCRIPTION OF EMBODIMENT

Hereinafter, an embodiment to which a game controller of the present invention is applied will be described. An object is to provide a game controller that can provide a user with fine tactile sensations when operating the game controller.

<Embodiment>

Figure 1:
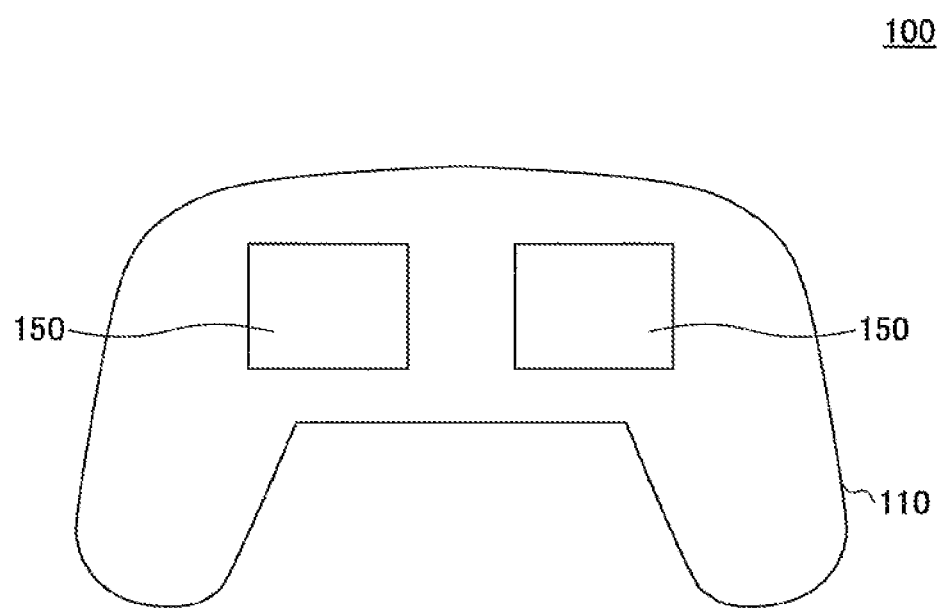
FIG. 1 is a perspective view of a game controller according to an embodiment.

FIG. 1 is a perspective view of a game controller 100 according to an embodiment.

The game controller 100 includes a housing 110 and two touch panels 150. The game controller 100 is a so-called remote controller connected to a game machine body by a wire or radio.

The game controller 100 is manipulated by a user who performs a manipulation input on the touch panels 150 with fingertips or the like to operate a game machine body. Because the game controller 100 includes the two touch panels 150, the user can manipulate the two touch panels 150 with both hands while holding the game controller 100 with both hands.

For example, an acceleration sensor or a gyro sensor may be incorporated in the game controller 100. In this case, the user can change an angle of the game controller 100 and can shake the game controller 100 to manipulate the game machine body in addition to manipulating the game machine body via the touch panels 150.

Buttons may be disposed on the game controller 100.

Next, a specific peripheral configuration of the touch panel 150 of the game controller 100 is described with reference to FIG. 2.

Figure 2:
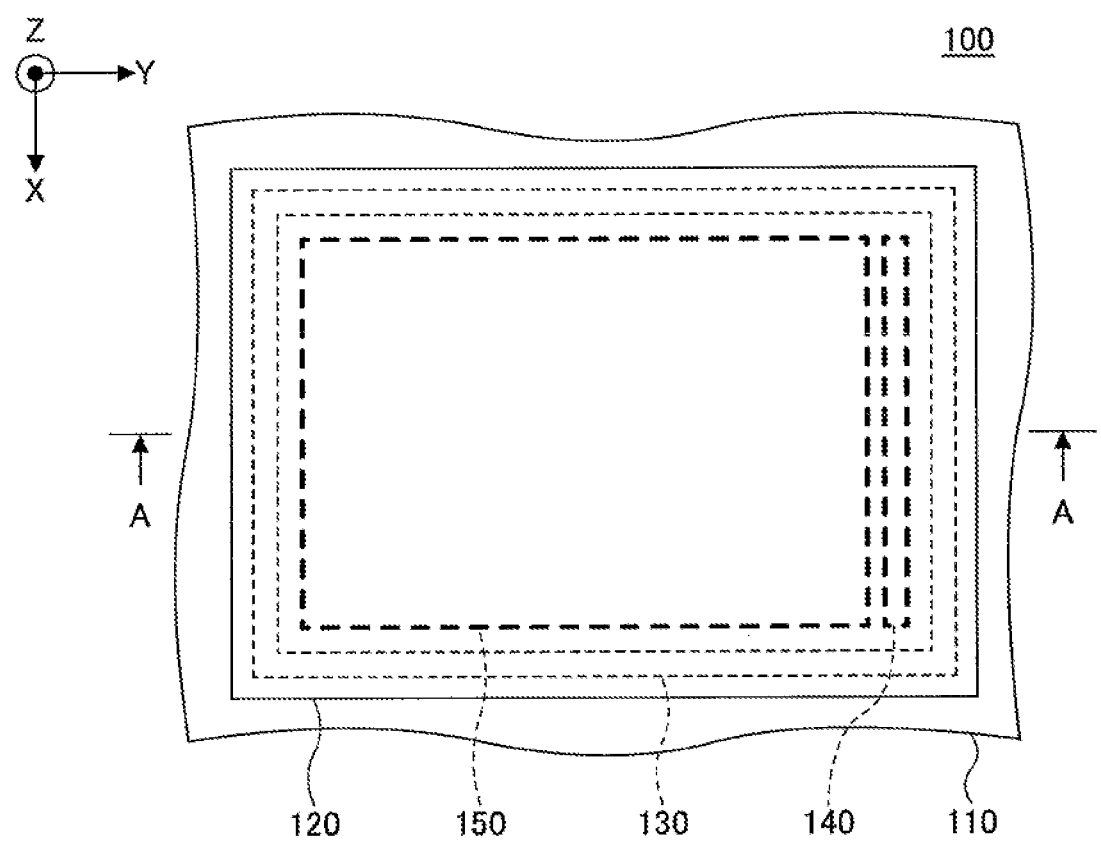
FIG. 2 is a diagram illustrating a touch panel of the game controller and its specific peripheral configuration according to the embodiment in plan view.
Figure 3:
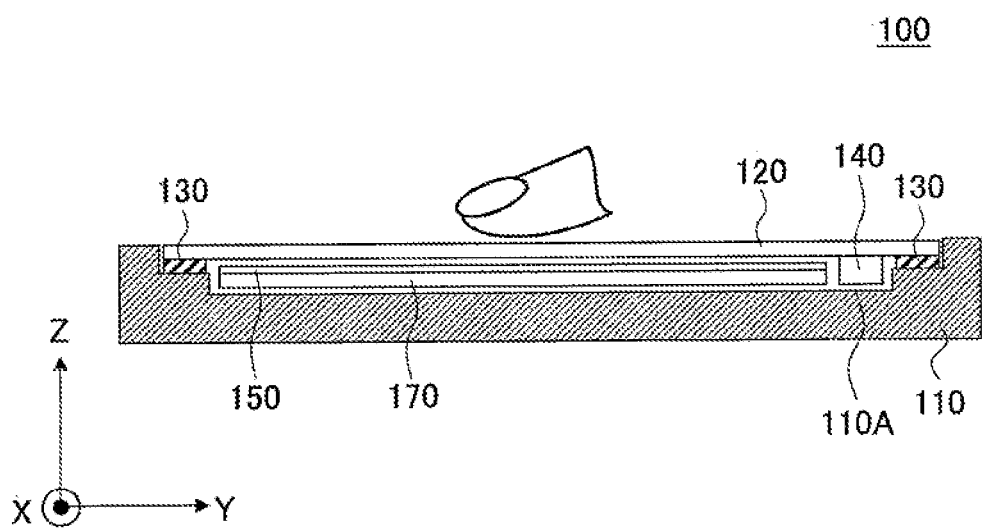
FIG. 3 is a diagram illustrating a cross-sectional view taken along a line A-A of FIG. 2.

FIG. 2 is a diagram illustrating the touch panel 150 of the game controller 100 and its specific peripheral configuration according to the embodiment in plan view. FIG. 3 is a diagram illustrating a cross-sectional view taken along a line A-A of FIG. 2. The touch panel 150 and its specific peripheral configuration illustrated in FIG. 2 correspond to one of the two touch panels 150 and its specific peripheral configuration illustrated in FIG. 1. A XYZ coordinate system as an orthogonal coordinate system is defined as illustrated in FIGS. 2 and 3.

The game controller 100 includes the housing 110, a top panel 120, a double-faced adhesive tape 130, a vibrating element 140, the touch panel 150, and a substrate 170.

The housing 110 is made of a plastic, for example. As illustrated in FIG. 3, the substrate 170 and the touch panel 150 are contained in a concave portion 110A of the housing 110, and the top panel 120 is adhered to the housing 110 by the double-faced adhesive tape 130. The rectangular concave portion 110A in plan view is formed on the housing 110. Thereby, a rectangular opening formed by the concave portion 110A is present in the housing 110. In FIG. 2, this opening is substantially coincident with a rectangular opening of the double-faced adhesive tape 130 having a rectangular-ring shape. In FIG. 2, the touch panel 150 is positioned inside of the rectangular opening of the concave portion 110A.

The top panel 120 is a plate-shaped member having a rectangular shape in plan view and is made of glass or a reinforced plastic such as polycarbonate. A surface of the top panel 120 which is located on a positive side in Z axis direction is one example of a manipulation input surface into which the user of the game controller 100 performs a manipulation input.

The vibrating element 140 is bonded on a surface of the top panel 120 which is located on a negative side in Z axis direction, and four sides in plan view of the top panel 120 are adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four sides of the top panel 120 to the housing 110.

The touch panel 150 is disposed on the negative side in Z axis direction of the top panel 120. The top panel 120 is provided in order to protect the surface of the touch panel 150. Another panel, protection film or the like may be provided on the surface of the top panel 120.

In a state where the vibrating element 140 is bonded to the surface of the top panel 120 located on the negative side in Z axis direction, the top panel 120 vibrates if the vibrating element 140 is being driven. In the embodiment, a standing wave is generated in the top panel 120 by causing the top panel 120 to vibrate at a natural vibration frequency (natural resonance frequency or eigenfrequency) of the top panel 120. Since the vibrating element 140 is bonded to the top panel 120, it is preferable to determine the natural vibration frequency in consideration of a weight of the vibrating element 140 of the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration an ultrasound-frequency-band. A piezoelectric element such as a piezo element is used as the vibrating element 140, for example.

The vibrating element 140 is driven in accordance with a driving signal output from the drive controlling part which will be described later. An amplitude (intensity) and a frequency of the vibration output from the vibrating element 140 is set (determined) by the driving signal. An on/off action of the vibrating element 140 is controlled in accordance with the driving signal.

The ultrasound-frequency-band is a frequency band which is higher than or equal to about 20 kHz, for example. According to the game controller 100 of the embodiment, the frequency at which the vibrating element 140 vibrates is equal to a number of vibrations per unit time (frequency) of the top panel 120. Accordingly, the vibrating element 140 is driven in accordance with the driving signal so that the vibrating element 140 vibrates at a number of natural vibrations per unit time (natural vibration frequency) of the top panel 120.

The touch panel 150 is disposed on an upper side (positive side in Z axis direction) of the substrate 170 and is disposed on a lower side (negative side in Z axis direction) of the top panel 120. The touch panel 150 is one example of a coordinate detector which detects a position at which the user of the game controller 100 touches the top panel 120. Hereinafter, the position is referred to as a position of the manipulation input.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is a capacitance type, the touch panel 150 can detect the manipulation input performed on the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is a capacitance type, the touch panel 150 may be disposed on the top panel 120. In this case, the surface of the touch panel 150 constitutes the manipulation input surface. In a case where the touch panel 150 is a capacitance type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The substrate 170 is disposed inside of the concave portion 110A of the housing 110. The touch panel 150 is disposed on the substrate 170. The touch panel 150 is fixed to the substrate 170 and the housing 110 by a holder or the like (not shown).

On the substrate 170, a drive controlling apparatus which will be described hereinafter and circuits or the like that are necessary for driving the game controller 100 are mounted.

In the game controller 100 having the configuration as described above, when the user touches the top panel 120 with the fingertip and a movement of the fingertip is detected, the drive controlling part mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The game controller 100 generates the standing wave in the ultrasound-frequency-band in the top panel 120 to provide a tactile sensation (haptic sensation) to the user through the top panel 120.

Next, the standing wave generated in the top panel 120 is described with reference to FIGS. 4A and 4B.

Figures 4A, 4B:
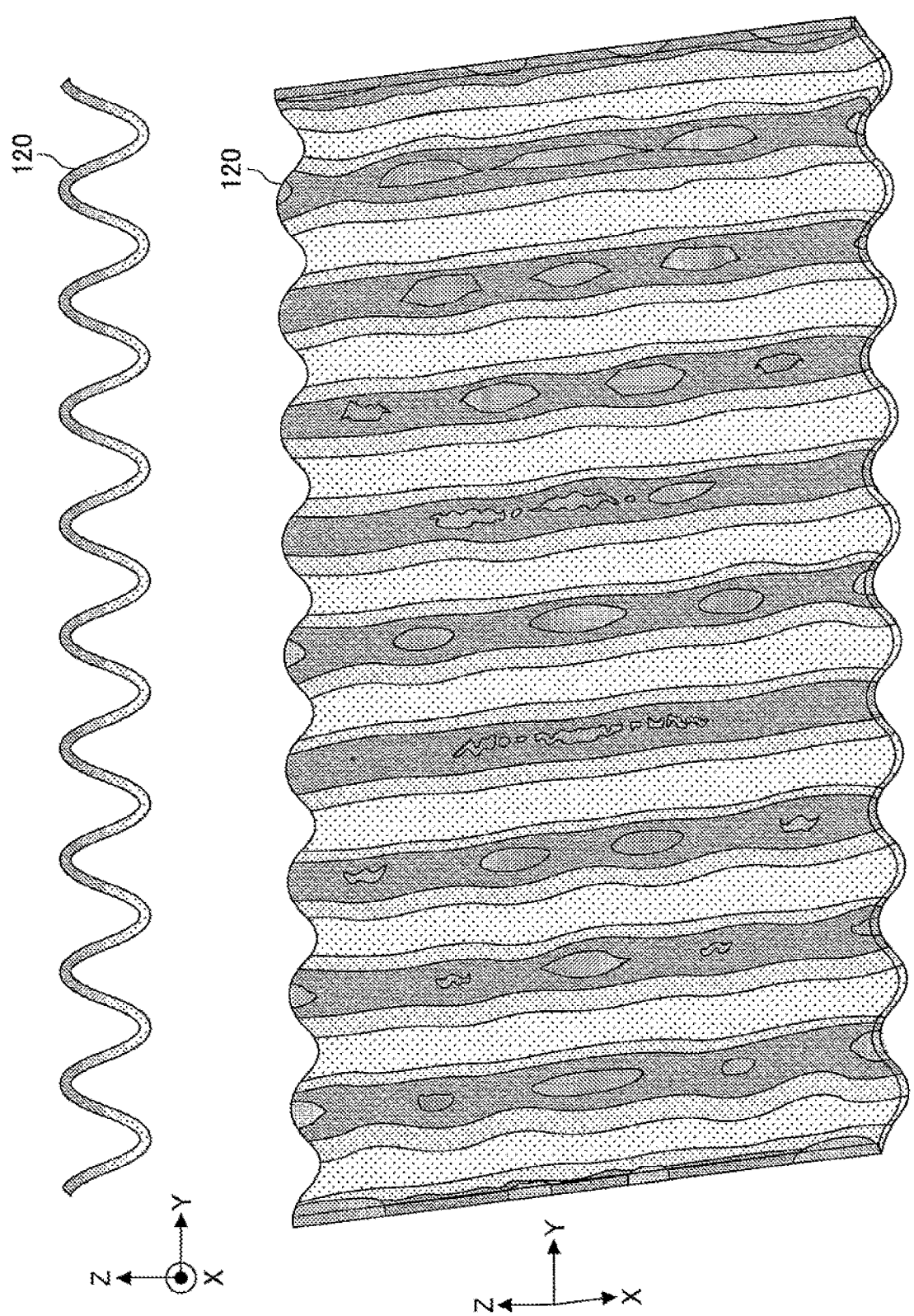
FIG. 4A is a diagram illustrating crests and troughs of a standing wave formed in parallel with the short side of a top panel.
FIG. 4B is a diagram illustrating the crests and the troughs of the standing wave formed in parallel with the short side of the top panel.

FIGS. 4A and 4B are diagrams illustrating crests and troughs of the standing wave formed in parallel with the short side of the top panel 120 included in the standing waves generated in the top panel 120 by the natural vibration in the ultrasound-frequency-band. FIG. 4A illustrates a side view, and FIG. 4B illustrates a perspective view. In FIGS. 4A and 4B, a XYZ coordinate system similar to that described in FIGS. 2 and 3 is defined. In FIGS. 4A and 4B, the amplitude of the standing wave is overdrawn in an easy-to-understand manner. The vibrating element 140 is omitted in FIGS. 4A and 4B.

The natural vibration frequency (the resonance frequency) f of the top panel 120 is represented by formulas (1) and (2) where E is the Young's modulus of the top panel 120, $\rho$ is the density of the top panel 120, $\delta$ is the Poisson's ratio of the top panel 120, l is the long side dimension of the top panel 120, t is the thickness of the top panel 120, and k is a periodic number of the standing wave along the direction of the long side of the top panel 120. Because the standing wave has the same waveforms in every half cycle, the periodic number k takes values at 0.5 intervals. The periodic number k takes 0.5, 1, 1.5, 2 . . . .

$$f = \frac{\pi k^2 t}{l^2} \sqrt{\frac{E}{3\rho(1-\delta^2)}} \quad (1)$$

$$f = \alpha k^2 \quad (2)$$

The coefficient $\alpha$ included in formula (2) corresponds to coefficients other than $k^2$ included in formula (1).

A waveform of the standing wave as illustrated FIGS. 4A and 4B is obtained in a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the driving signal is 33.5 kHz.

The top panel 120 is a planar member. If the vibrating element 140 (see FIGS. 2 and 3) is driven and the natural vibration in the ultrasound-frequency-band is generated in the top panel 120, the top panel 120 is bent as illustrated in FIGS. 4A and 4B. As a result, the standing wave is generated in the surface of the top panel 120.

In the present embodiment, the single vibrating element 140 is bonded on the surface of the top panel 120 which is located on the negative side in Z axis direction at the location along the short side extending in X axis direction at the positive side in Y axis direction. The game controller 100 may include two vibrating elements 140 for the single top panel 120. In a case where the game controller 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 may be symmetrically disposed with respect to a center line of the top panel 120 parallel to the two short sides of the top panel 120.

In a case where the game controller 100 includes two vibrating elements 140, the two vibrating elements 140 may be driven in the same phase, if the periodic number k is an integer number. If the periodic number k is an odd number, the two vibrating elements 140 may be driven in opposite phases.

Next, the natural vibration at ultrasound-frequency-band generated in the top panel 120 of the game controller 100 is described with reference to FIGS. 5A and 5B.

Figure 5A:
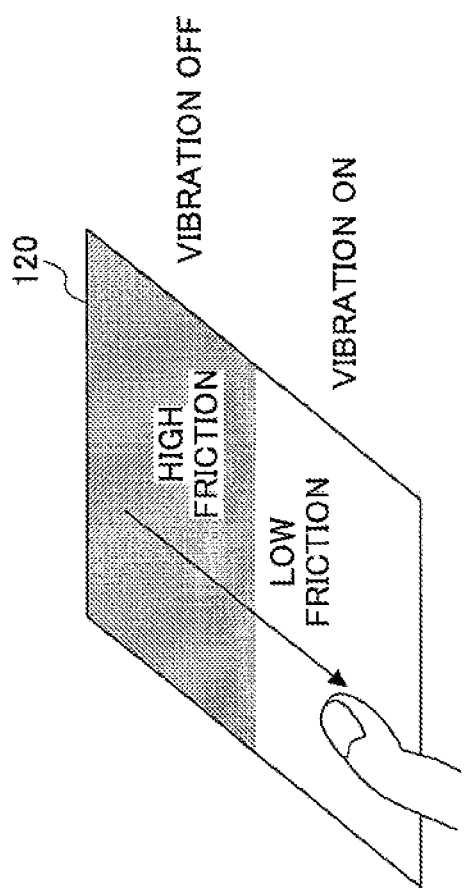
FIG. 5A is a diagram illustrating a case where a kinetic friction force applied to a fingertip varies when a natural vibration in an ultrasound-frequency-band is generated in the top panel of the game controller.
Figure 5B:
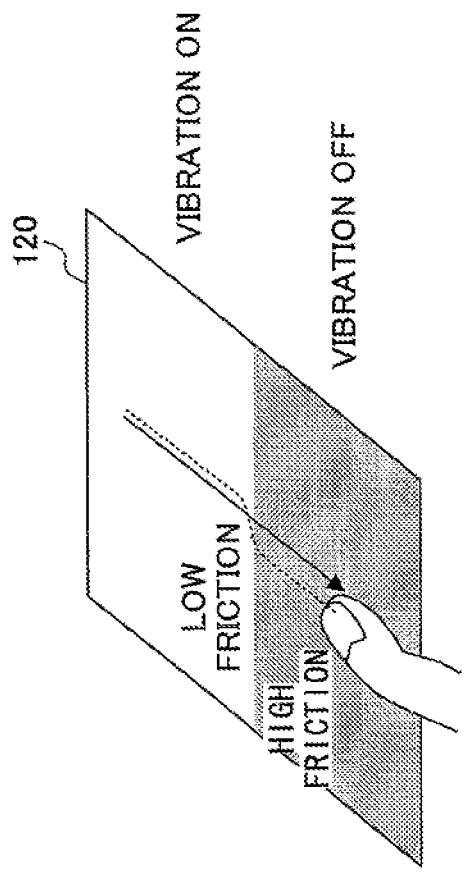
FIG. 5B is a diagram illustrating a case where the kinetic friction force applied to the fingertip varies when the natural vibration in the ultrasound-frequency-band is generated in the top panel of the game controller.

FIGS. 5A and 5B are diagrams illustrating cases where a kinetic friction force applied to the fingertip varies when the natural vibration in the ultrasound-frequency-band is generated in the top panel 120 of the game controller 100. In FIGS. 5A and 5B, the manipulation input is performed with the fingertip. In FIGS. 5A and 5B, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In FIGS. 5A and 5B, areas which the fingertip touches while the vibration is being turned off are indicated in grey in the depth direction of the top panel 120. Areas which the fingertip touches while the vibration is being turned on are indicated in white in the depth direction of the top panel 120.

As illustrated in FIGS. 4A and 4B, the natural vibration in the ultrasound-frequency-band occurs on an entire surface of the top panel 120. FIGS. 5A and 5B illustrate operation patterns in which the on/off state of the natural vibration is switched while the user's fingertip is tracing the top panel 120 from the far side to the near side.

Accordingly, in FIGS. 5A and 5B, areas which the fingertip touches while the vibration is being turned off are indicated in grey in the depth direction of the top panel 120. Areas which the fingertip touches while the vibration is being turned on are indicated in white in the depth direction of the top panel 120.

In the operation pattern as illustrated in FIG. 5A, the vibration is turned off when the user's fingertip is located on the far side of the top panel 120, and the vibration is turned on in the process of tracing the top panel 120 with the fingertip toward the near side.

On the contrary, in the operation pattern as illustrated in FIG. 5B, the vibration is turned on when the user's fingertip is located on the far side of the top panel 120, and the vibration is turned off in the process of tracing the top panel 120 with the fingertip toward the near side.

In a state where the natural vibration in the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in FIG. 5A, the kinetic friction force applied to the fingertip increases. In the white area located on the near side of the top panel 120, the kinetic friction force applied to the fingertip decreases.

Therefore, the user who is performing the manipulation input to the top panel 120 in a manner as illustrated in FIG. 5A senses a reduction of the kinetic friction force applied to the fingertip when the vibration is turned on. As a result, the user senses a slippery or smooth touch (texture) with the fingertip. In this case, the user senses as if a concave portion were present on the surface of the top panel 120 when the surface of the top panel 120 becomes slippery and the kinetic friction force decreases.

On the contrary, in the white area located on the far side of the top panel 120 as illustrated in FIG. 5B, the kinetic friction force applied to the fingertip decreases. In the grey area located on the near side of the top panel 120, the kinetic friction force applied to the fingertip increases.

Therefore, the user who is performing the manipulation input in the top panel 120 in a manner as illustrated in FIG. 5B senses an increase of the kinetic friction force applied to the fingertip when the vibration is turned off. As a result, the user senses a grippy or scratchy touch (texture) with the fingertip. In this case, the user senses as if a convex portion were present on the surface of the top panel 120 when the surface of the top panel 120 becomes grippy and the kinetic friction force increases.

Accordingly, the user can sense a concavity or convexity with the fingertip in the cases as illustrated in FIGS. 5A and 5B. For example, "The Printed-matter Typecasting Method for Haptic Feel Design and Sticky-band Illusion" (the Collection of papers of the 11th SICE system integration division annual conference (SI2010, Sendai)_174-177, 2010-12) discloses that a human can sense a concavity or a convexity. "Fishbone Tactile Illusion" (Collection of papers of the 10th Congress of the Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

In the following, a configuration of the game controller 100 according to the embodiment is described with reference to FIG. 6.

Figure 6:
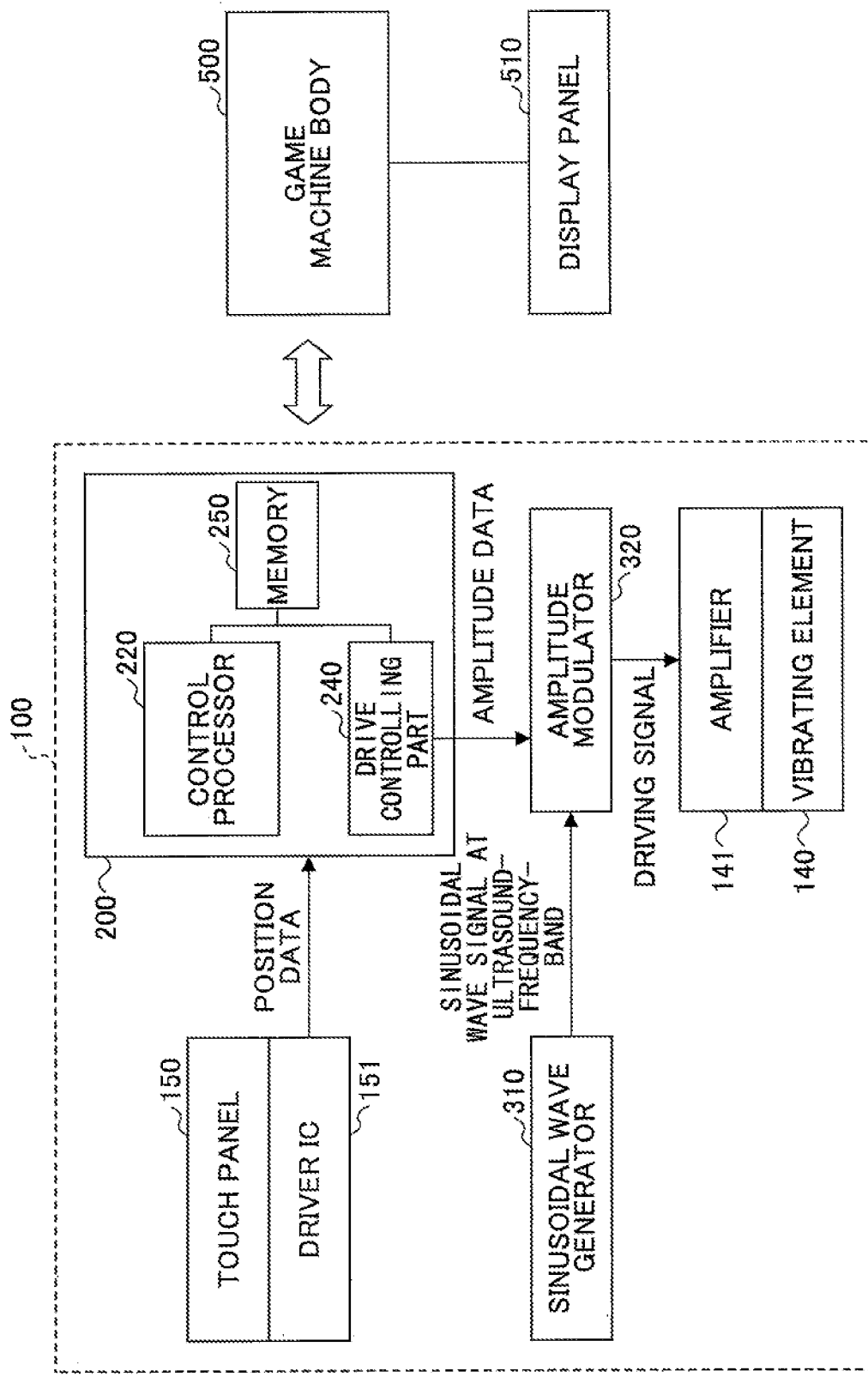
FIG. 6 is a diagram illustrating a configuration of the game controller according to embodiment.

FIG. 6 is a diagram illustrating the configuration of the game controller 100 according to the embodiment. FIG. 6 illustrates a display panel 510 and a game machine body 500 connected to the game controller 100 by a wire or radio.

The game controller 100 includes the vibrating element 140, an amplifier 141, the touch panel 150, a driver Integrated Circuit (IC) 151, a controlling apparatus 200, a sinusoidal wave generator 310, and an amplitude modulator 320.

The controlling apparatus 200 includes an control processor 220, a drive controlling part 240, and a memory 250. The controlling apparatus 200 is realized by an IC chip, for example.

Although an embodiment in which the control processor 220, the communication processor 230, the drive controlling part 240 and the memory 250 are included in the single controlling apparatus 200 is described, the drive controlling part 240 may be disposed outside of the controlling apparatus 200 and realized by another IC chip or a processor. In this case, data which is necessary for a drive control performed by the drive controlling part 240 among data stored in the memory 250 may be stored in another memory.

In FIG. 6, the housing 110, the top panel 120, the double-faced adhesive tape 130, and the substrate 170 (see FIG. 2) are omitted. Herein, the amplifier 141, the driver IC 151, the control processor 220, the drive controlling part 240, the memory 250, the sinusoidal wave generator 310, and the amplitude modulator 320 are described.

The amplifier 141 is disposed between the amplitude modulator 320 and the vibrating element 140. The amplifier 141 amplifies the driving signal output from the amplitude modulator 320 and drives the vibrating element 140.

The driver IC 151 is connected to the touch panel 150. The driver IC 151 detects position data representing the position on the touch panel 150 at which the manipulation input is performed and outputs the position data to the controlling apparatus 200. As a result, the position data is input to the control processor 220 and the drive controlling part 240.

The control processor 220 performs control processing except for controlling processing performed by the drive controlling part 240 among control processing of the game controller 100.

The drive controlling part 240 outputs amplitude data to the amplitude modulator 320. The amplitude data represents an amplitude value used for controlling an intensity of the driving signal used for driving the vibrating element 140. The amplitude data that represents the amplitude value may be stored in the memory 250.

The game controller 100 of the embodiment causes the top panel 120 to vibrate in order to vary the kinetic friction force applied to the user's fingertip when the fingertip traces along the surface of the top panel 120.

There are various manipulation inputs such as a flick operation, a swipe operation and a drag operation, for example, that the user performs when the user moves the fingertip along the surface of the top panel 120.

The flick operation is performed by flicking (snapping) the surface of the top panel 120 for a relatively-short distance with the fingertip. The swipe operation is performed by swiping the surface of the top panel 120 for a relatively-long distance with the fingertip. The drag operation is performed by moving the fingertip along the surface of the top panel 120 while selecting a button or the like displayed on the display panel 510 when the user slides the button of the like.

The manipulation inputs that are performed by moving the fingertip along the surface of the top panel 120, such as the flick operation, the swipe operation and the drag operation that are introduced as examples, are used differently depending on a kind of a display by an application. Accordingly, when it is determined whether the position of the fingertip performing the manipulation input is within a designated area which requires generating the vibration, the kind of the application activated by the game controller 100 is concerned to the determination.

The memory 250 stores the amplitude data, representing the amplitude, and pattern data, representing vibration patterns. In the memory 250, data that is necessary to be associated with each other among the data as described above may be stored as table format data using identifiers and the like, for example.

The memory 250 stores data, programs, and the like that are necessary for the control processor 220 to execute the control processing.

The sinusoidal wave generator 310 generates sinusoidal waves used for generating the driving signal which causes the top panel 120 to vibrate at the natural vibration frequency. For example, in a case of causing the top panel 120 to vibrate at 33.5 kHz of the natural vibration frequency f, a frequency of the sinusoidal waves becomes 33.5 kHz. The sinusoidal wave generator 310 inputs a sinusoidal wave signal in the ultrasound-frequency-band to the amplitude modulator 320.

The amplitude modulator 320 generates the driving signal by modulating an amplitude of the sinusoidal wave signal input from the sinusoidal wave generator 310 based on the amplitude data input from the drive controlling part 240. The amplitude modulator 320 modulates only the amplitude of the sinusoidal wave signal in the ultrasound-frequency-band input from the sinusoidal wave generator 310 and does not modulate a frequency and a phase of the sinusoidal wave signal in order to generate the driving signal.

Therefore, the driving signal output from the amplitude modulator 320 is a sinusoidal wave signal in the ultrasound-frequency-band obtained by modulating only the amplitude of the sinusoidal wave signal in the ultrasound-frequency-band input from the sinusoidal wave generator 310. In a case where the amplitude data is zero, the amplitude of the driving signal becomes zero. This is the same as the amplitude modulator 320 not outputting the driving signal.

The game controller 100 is connected to the game machine body 500 via a cable or radio such as a wireless Local Area Network (LAN) or Bluetooth (registered trademark). The user who operates the game machine body 500 performs the manipulation input on the top panel 120 of the game controller 100.

The game controller 100 transmits, to the game machine body 500, a manipulation signal that represents a content of the manipulation input performed on the surface of the top panel 120. The game machine body 500 controls an image displayed on the display panel 510 in accordance with progress of a video game and performs control based on the manipulation signal input from the game controller 100.

For example, in a case where the manipulation is performed to move an object such as a vehicle or a man, a pointer, a cursor or the like displayed on the display panel 510, a starting point of the manipulation input performed on an arbitrary position on the surface of the top panel 120 corresponds to a display position of the object, the pointer, the cursor or the like.

Movements of the manipulation input performed on the top panel 120 correspond to movements of the object, the pointer, the cursor or the like. The movements of the manipulation input relative to the starting point correspond to relative movements of the object, the pointer, the cursor or the like in a display screen on the display panel 510.

Among data necessary for the game machine body 500 to control the screen, coordinate data is input to the game controller 100 from the game machine body 500. The coordinate data represents coordinate positions in the screen of the image relating to driving of the vibrating element 140.

The drive controlling part 240 of the game controller 100 drives the vibrating element 140 in accordance with the manipulation input on the surface of the top panel 120 and drives the vibrating element 140 in accordance with the coordinate data input from the game machine body 500.

Figure 7:
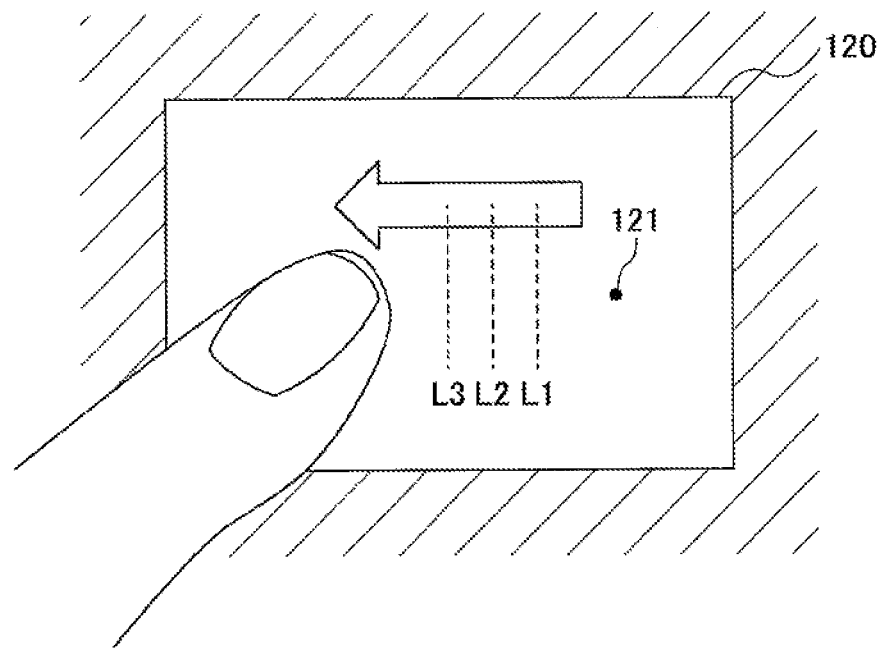
FIG. 7 is a diagram illustrating a state in which a manipulation input is performed on a surface of the top panel of the game controller according to the embodiment.

FIG. 7 is a diagram illustrating a state in which the manipulation input is performed on the surface of the top panel 120 of the game controller 100 according to the embodiment. The touch panel 150 (see FIGS. 2 and 3) is disposed on the back side of the top panel 120, though it is not illustrated in FIG. 7.

Figure 8:
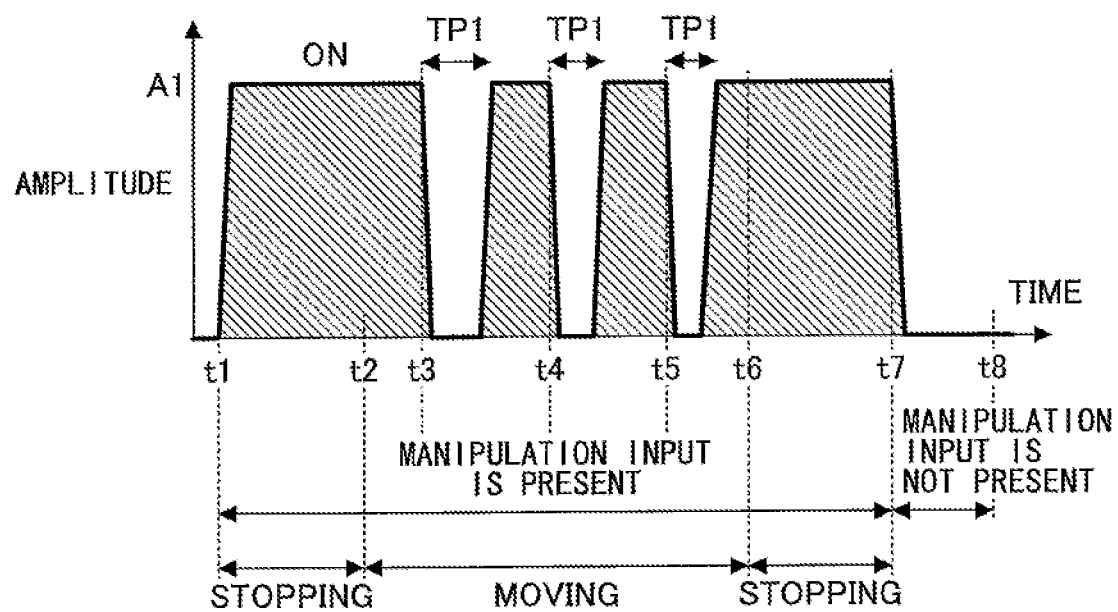
FIG. 8 is a diagram illustrating an example of an operation of the game controller according to the embodiment.

FIG. 8 is a diagram illustrating an example of an operation of the game controller 100 according to the embodiment. FIG. 8 illustrates driving patterns for driving the vibrating element 140 in accordance with the manipulation input illustrated in FIG. 7. In FIG. 8, a horizontal axis represents time, and a vertical axis represents an amplitude value of the amplitude data.

As illustrated in FIG. 7, in a case where the manipulation input is performed along an arrow on the surface of the top panel 120, the vibrating element 140 is turned on at a point of time at which the manipulation input starts, and the vibrating element 140 is turned off when a movement amount of the manipulation input from the starting point 121 reaches a designated movement amount.

For example, the vibrating element 140 is turned on when the drag operation is performed from the starting point 121 illustrated in FIG. 7. The vibrating element 140 is turned off when the position of the manipulation input passes positions represented by three dashed lines L1, L2, and L3.

The three dashed lines L1, L2, and L3 in FIG. 7 are illustrated for representing the movement amount from the starting point in a direction of movement of the manipulation input. The movement amount determined here is a relative amount of movement relative to the starting point 121.

In the operation of the vibrating element 140 illustrated in FIG. 7, the drive controlling part 240 outputs the amplitude data of which the amplitude value is A1 and the vibrating element 140 is turned on when the manipulation input is performed at a time t1 as illustrated in FIG. 8.

The position of the manipulation input stops and does not move from the time t1 until a time t2. Because the manipulation input is performed between the time t1 and the time t2, the drive controlling part 240 continuously outputs the amplitude data of which the amplitude value is A1 and the vibrating element is held in an on-state.

When the position of the manipulation input starts to move at the time t2, the drive controlling part 240 continuously outputs the amplitude data of which the amplitude value is A1 and the vibrating element is held in the on-state.

Because the kinetic friction coefficient applied to the user's fingertip is decreased by the squeeze film effect, the fingertip becomes easy to move over the surface of the top panel 120.

When the movement amount of the manipulation input reaches a designated movement amount corresponding to a length from the starting point 121 (see FIG. 7) to the first dashed line L1 at the time t3, the drive controlling part 240 sets the amplitude value of the amplitude data to zero. In this way, the vibrating element 140 is turned off.

When the vibrating element 140 is turned off, the user senses an increase of the kinetic friction force applied to the fingertip. As a result, the user senses a grippy or scratchy touch (texture) with the fingertip. In this case, the user senses as if a convex portion were present on the surface of the top panel 120 when the surface of the top panel 120 becomes grippy and the kinetic friction force increases.

The vibrating element 140 is turned off only for a time period TP1. The time period TP1 may be about 50 milliseconds, for example. When the time period TP1 has elapsed, the drive controlling part 240 outputs the amplitude data of which the amplitude value is A1 and the vibrating element is turned on again.

When the movement amount of the manipulation input reaches a movement amount corresponding to a length from the starting point 121 (see FIG. 7) to the second dashed line L2 at a time t4, the drive controlling part 240 sets the amplitude value of the amplitude data to zero. In this way, the vibrating element 140 is turned off and the kinetic friction force applied to the fingertip increases. Thereby, the user feels as if the convex portion were present on the surface of the top panel 120.

The vibrating element 140 is turned off only for the time period TP1. When the time period TP1 has elapsed, the drive controlling part 240 outputs the amplitude data of which the amplitude value is A1 and the vibrating element is turned on again.

When the movement amount of the manipulation input reaches a movement amount corresponding to a length from the starting point 121 (see FIG. 7) to the third dashed line L3 at a time t5, the drive controlling part 240 sets the amplitude value of the amplitude data to zero. In this way, the vibrating element 140 is turned off and the kinetic friction force applied to the fingertip increases. Thereby, the user feels as if the convex portion were present on the surface of the top panel 120.

The vibrating element 140 is turned off only for the time period TP1. When the time period TP1 has elapsed, the drive controlling part 240 outputs the amplitude data of which the amplitude value is A1 and the vibrating element is turned on again.

Because the movement of the manipulation input is stopped at a time t6 and the manipulation input is performed by the fingertip touching the surface of the top panel 120 until a time t7, the drive controlling part 240 continuously outputs the amplitude data of which the amplitude value is A1 and the vibrating element 140 is held in the on-state.

When the fingertip separates from the surface of the top panel 120 and the manipulation input is stopped at the time t7, the drive controlling part 240 sets the amplitude value of the amplitude data to zero and the vibrating element 140 is turned off.

Figure 9:
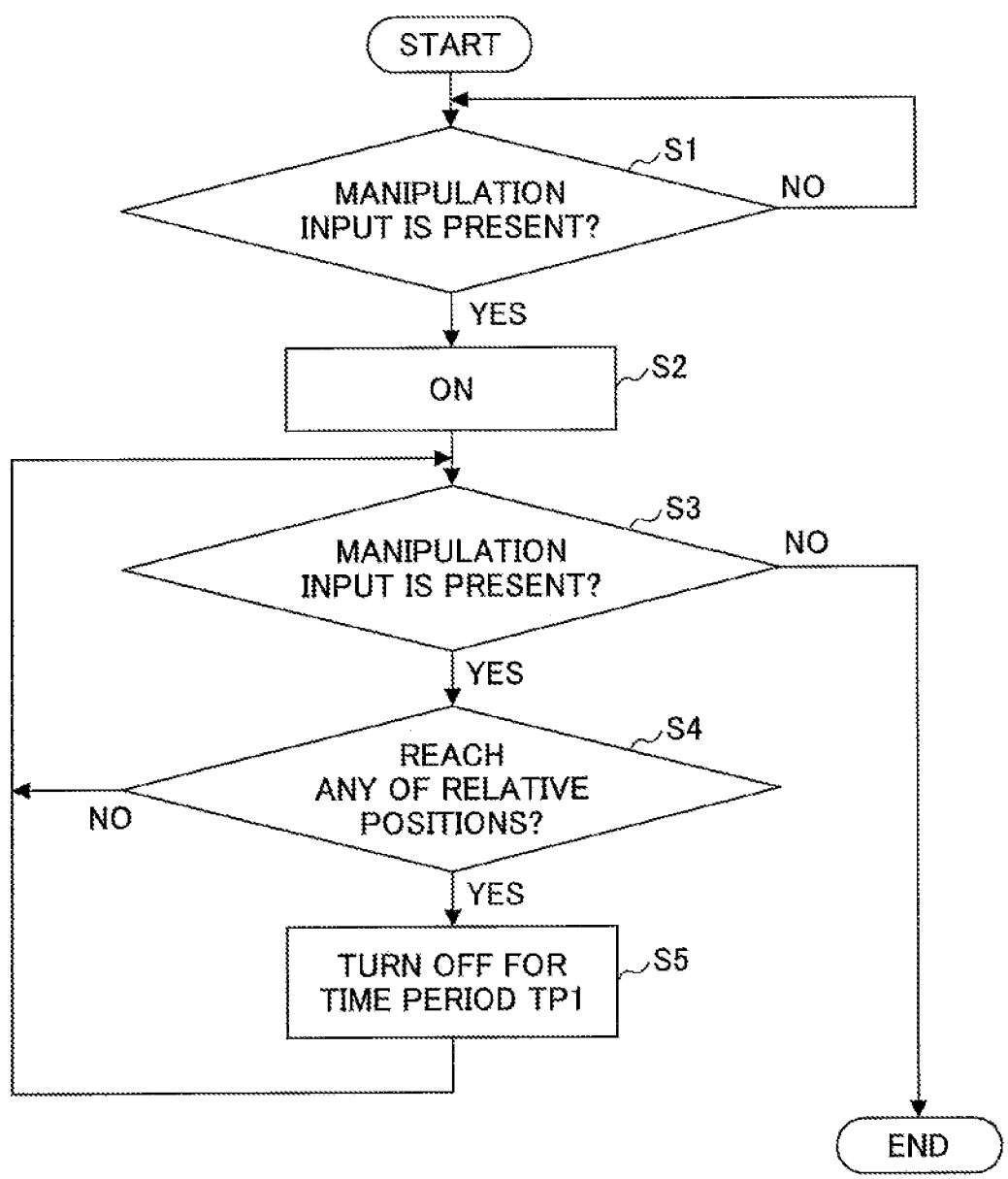
FIG. 9 is a diagram illustrating a flowchart executed by a drive controlling part of the game controller according to the embodiment.

FIG. 9 is a diagram illustrating a flowchart executed by the drive controlling part 240 of the game controller 100 according to the embodiment.

An operating system (OS) of the game controller 100 executes control for driving the game controller 100 with respect to every designated control cycle. Accordingly, the drive controlling part 240 repeatedly executes the flow illustrated in FIG. 9 with respect to every designated control cycle.

Before processing is started, the drive controlling part 240 does not output the amplitude data and the vibrating element 140 is in the off-state.

The drive controlling part 240 starts the processing when the power source of the game controller 100 is turned on.

The drive controlling part 240 determines whether the manipulation input is present (step S1). The drive controlling part 240 may determine presence/absence of the manipulation input based on whether the position data is input from the driver IC 151 (FIG. 6).

When the drive controlling part 240 determines that the manipulation input is present, (yes at step S1), the drive controlling part 240 uses the driving signal having the amplitude A1 to drive the vibrating element 140 (step S2). In this way, the natural vibration in the ultrasound-frequency-band is generated in the top panel 120.

When the drive controlling part 240 determines that the manipulation input is present, the drive controlling part 240 stores coordinates from which the manipulation input is started as the starting point. Position data input first from the driver IC 151 (see FIG. 6) may be used as the coordinates from which the manipulation input is started.

Next, the drive controlling part 240 determines whether the manipulation input is present (step S3). This is to determine whether the manipulation input continues.

When the drive controlling part 240 determines that the manipulation input is present (yes at step S3), the drive controlling part 240 determines whether the movement amount of the manipulation input from the starting point reaches any of relative positions (step S4). Any of the relative positions are the positions of the three dashed lines L1, L2, and L3 relative to the starting point 121 illustrated in FIG. 7, and are determined by a distance from the starting point 121 in the direction of movement of the manipulation input. In FIG. 7, the relative positions relative to the starting point 121 are determined by distances between the starting point 121 and the respective three dashed lines L1, L2, and L3 in the direction of movement of the manipulation input represented by the arrow.

When the drive controlling part 240 determines that the movement amount of the manipulation input from the starting point reaches any of the relative positions (yes at step S4), the drive controlling part 240 turns off the driving signal for the time period TP1 (step S5). In this way, the natural vibration in the ultrasound-frequency-band of the top panel 120 is turned off for the time period TP1. As described above, the time period TP1 may be set to be 50 milliseconds, for example.

When the process at step S5 ends, the drive controlling part 240 returns the flow to step S3.

When the drive controlling part 240 determines that the manipulation input is not present (no at step S1), the drive controlling part 240 repeatedly executes the process of step S1. This is because the series of processes illustrated in FIG. 9 is started when the manipulation input is performed.

When the drive controlling part 240 determines that the manipulation input is not present (no at step S3), the series of processes ends (END). When the series of processes ends, the vibrating element 140 is turned off.

When the drive controlling part 240 determines that the movement amount does not reach any of relative positions (no at step S4), the flow returns to step S3.

The series of processes as described above is repeatedly executed while the power source of the game controller 100 is turned on.

In a case where the position of the manipulation input reaches the dashed line L1 at the time t3, the position of the manipulation input reaches the dashed line L2 at the time t4, and the position of the manipulation input reaches the dashed line L3 at the time t5 as illustrated in FIGS. 7 and 8, the flow proceeds as follows.

First, because the manipulation input is performed at the time t1, the drive controlling part 240 determines "YES" at step S1, and the vibrating element is turned on at step S2.

Subsequently, because the position of the manipulation input stops and does not move from the time t1 until the time t2, the drive controlling part 240 determines "YES" at step S3 and determines "NO" at step S4. From the time t1 until the time t2, subroutine processing at steps S3 and S4 are repeatedly executed. The vibrating element 140 is held in the on-state from the time t1 to the time t2.

When the position of the manipulation input starts to move at the time t2 and the position of the manipulation input reaches the dashed line L1 at the time t3, the drive controlling part 240 determines "YES" at step S4 and turns off the vibrating element 140 for the time period TP1 at step S5. When the time period TP1 has elapsed from the time t3, the drive controlling part 240 turns on the vibrating element 140.

After that, when the position of the manipulation input reaches the dashed line L2 at the time t4, the drive controlling part 240 determines "YES" at step S4 and turns off the vibrating element 140 for the time period TP1 at step S5. When the time period TP1 has elapsed from the time t4, the drive controlling part 240 turns on the vibrating element 140.

After that, when the position of the manipulation input reaches the dashed line L3 at the time t5, the drive controlling part 240 determines "YES" at step S4 and turns off the vibrating element 140 for the time period TP1 at step S5. When the time period TP1 has elapsed from the time t5, the drive controlling part 240 turns on the vibrating element 140.

When the position of the manipulation input stops at the time t6, the drive controlling part 240 determines "NO" at step S4. From the time t6 until the time t7, subroutine processing at steps S3 and S4 are repeatedly executed and the vibrating element 140 is held in the on-state. This is because the manipulation input is continuously performed.

When the manipulation input is stopped at the time t7, the drive controlling part 240 determines "NO" at step S3 and the series of processes ends (END). In this way, the vibrating element 140 is turned off.

For example, in a case where the user's fingertip separates from the top panel 120 and the manipulation input is stopped at the point of time at which the position of the manipulation input reaches the dashed line L1 at the time t3, the drive controlling part 240 determines "NO" at step S3 while the vibrating element 140 is turned off for the time period TP1 from the time t3. Thereby, the series of processes ends (END) without turning on the vibrating element 140 again. For this reason, the control cycle of the series of processes illustrated in FIG. 9 may be set shorter than the time period TP1.

The distance between the starting point 121 and each of the three dashed lines L1, L2, and L3 in the direction of movement of the manipulation input represented by the arrow illustrated in FIG. 7 may be set to an unit manipulation amount in the manipulation when the user plays the video game, for example. For example, in a case where the video game is a game for driving an automobile, the unit manipulation amount may be set to an amount corresponding to one increment of strength of a brake, degree of opening of an accelerator, a manipulation amount of a steering wheel or the like.

When the unit manipulation amount is set as described above, the tactile sensation can be provided to the user's fingertip as if the convex portion were present every time the manipulation amount reaches the unit manipulation amount. As a result, a fine operational feeling can be realized.

Figure 10:
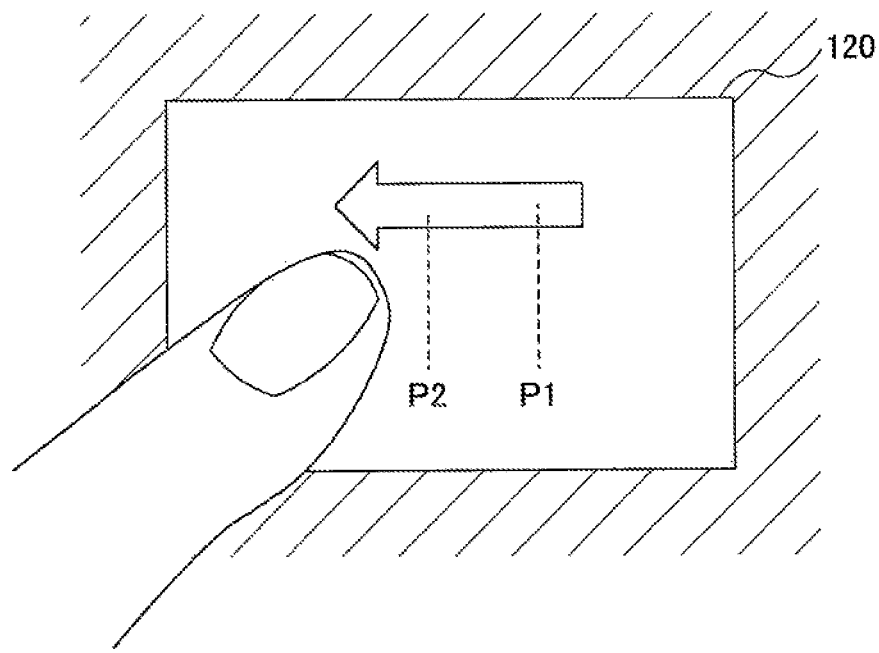
FIG. 10 is a diagram illustrating a state in which the manipulation input is performed on the surface of the top panel of the game controller according to the embodiment.

FIG. 10 is a diagram illustrating a state in which the manipulation input is performed on the surface of the top panel 120 of the game controller 100 according to the embodiment. The touch panel 150 (see FIGS. 2 and 3) is disposed on the back side of the top panel 120.

Figure 11:
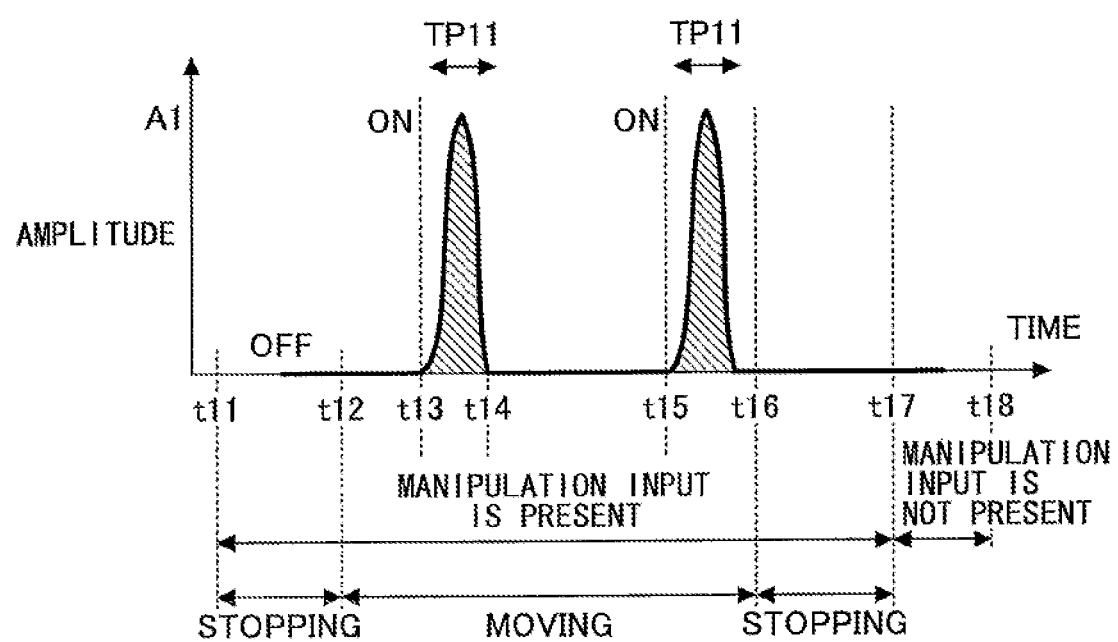
FIG. 11 is a diagram illustrating an example of an operation of the game controller according to the embodiment.

FIG. 11 is a diagram illustrating an example of an operation of the game controller 100 according to the embodiment. FIG. 11 illustrates driving patterns for driving the vibrating element 140 in accordance with the manipulation input illustrated in FIG. 10. In FIG. 11, a horizontal axis represents time, and a vertical axis represents the amplitude value of the amplitude data.

As illustrated in FIG. 10, the manipulation input is performed by the drag operation along an arrow on the surface of the top panel 120. It is supposed that the manipulation input is performed to move an object such as a vehicle or a man displayed on the display panel 510.

When the position of the manipulation input passes designated positions P1 and P2 on the top panel 120, the drive controlling part 240 turns on the vibrating element 140 for a very short time period.

If the drive controlling part 240 drives the vibrating element 140 as described above, the kinetic friction force applied to the fingertip decreases while the vibrating element 140 is turned on for the very short time period, and the kinetic friction force applied to the fingertip increases when the vibrating element 140 is turned off. Thereby, the fine tactile sensation can be provided to the user's fingertip as if the convex portion were present.

The above described processing can be realized by calculating coordinates of the designated positions P1 and P2 relative to the current position of the manipulation input of the top panel 120 based on data that represents a relative positional relationship between a current display position of the object displayed on the display screen of the display panel 510 and a designated spot in a traveling direction the object, for example.

When the object moves in the display screen of the display panel 510 and passes the designated spot in accordance with the manipulation input of the user playing the video game with the game controller 100, the position of the manipulation input passes the designated positions P1 and P2 on the top panel 120.

Accordingly, when the object, which moves in accordance with the manipulation input, passes the designated spot in the display screen on the display panel 510, the drive controlling part 240 turns on the vibrating element 140 for the very short time period to cause the user to feel that the object has passed the designated spot through the tactile sensations.

For example, the designated spot in the display screen on the display panel 510 may be set to a boundary between areas in the display screen, a spot that gives a point in accordance with the pass or the like.

The operation of the vibrating element 140 illustrated in FIG. 10 is described as follows with reference to FIG. 11.

When the manipulation input is performed at a time t11, the drive controlling part 240 outputs the amplitude data of which the amplitude value is zero and the vibrating element 140 is in an off-state.

The position of the manipulation input stops and does not move from the time t11 until a time t12. The vibrating element 140 is held in the off-state from the time t11 to the time t12.

When the position of the manipulation input starts to move at the time t12 and the position of the manipulation input reaches the position P1 (see FIG. 10) at a time 13, the drive controlling part 240 sets the amplitude value of the amplitude data to A1 for the very short time period TP11. In this way, the vibrating element 140 is turned on for the time period TP11.

Because the kinetic friction coefficient applied to the user's fingertip is decreased by the squeeze film effect when the vibrating element 140 is turned on, the fingertip becomes easy to move over the surface of the top panel 120.

When the time period TP 11 ends at a time t14, the drive controlling part 240 sets the amplitude value of the amplitude data to zero. In this way, the user feels as if the convex portion were present on the surface of the top panel 120 when the vibrating element 140 is turned off and the kinetic friction force applied to the fingertip increases.

The time period TP1 for turning on the vibrating element 140 may be about 100 milliseconds, for example.

When the position of the manipulation input moves from the time t14 until the time t15 and the position of the manipulation input reaches the position P2 (see FIG. 10) at the time t15, the drive controlling part 240 sets the amplitude value of the amplitude data to A1 for the very short time period TP11. In this way, the vibrating element 140 is turned on for the time period TP11.

Because the kinetic friction coefficient applied to the user's fingertip is decreased by the squeeze film effect when the vibrating element 140 is turned on, the fingertip becomes easy to move over the surface of the top panel 120.

When the time period TP 11 ends, the drive controlling part 240 sets the amplitude value of the amplitude data to zero. In this way, the user feels as if the convex portion were present on the surface of the top panel 120 when the vibrating element 140 is turned off and the kinetic friction force applied to the fingertip increases.

The position of the manipulation input is stopped at the time t16 and the manipulation input is performed by the fingertip touching the surface of the top panel 120 until the time t17. The vibrating element 140 is held in the off-state until the time t17.

At the time t17, the fingertip separates from the top panel 120 and the manipulation input is stopped.

Figure 12:
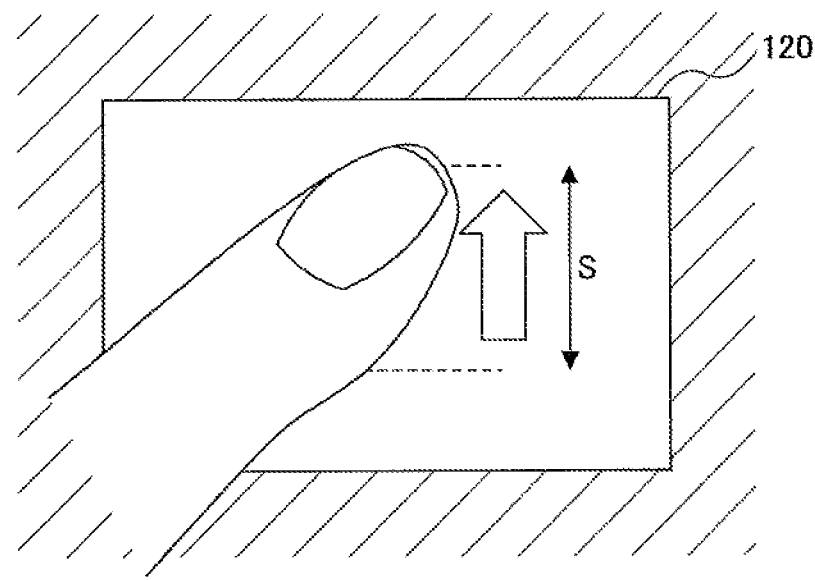
FIG. 12 is a diagram illustrating a state in which the manipulation input is performed on the surface of the top panel of the game controller according to the embodiment.

FIG. 12 is a diagram illustrating a state in which the manipulation input is performed on the surface of the top panel 120 of the game controller 100 according to the embodiment. The touch panel 150 (see FIGS. 2 and 3) is disposed on the back side of the top panel 120.

Figure 13:
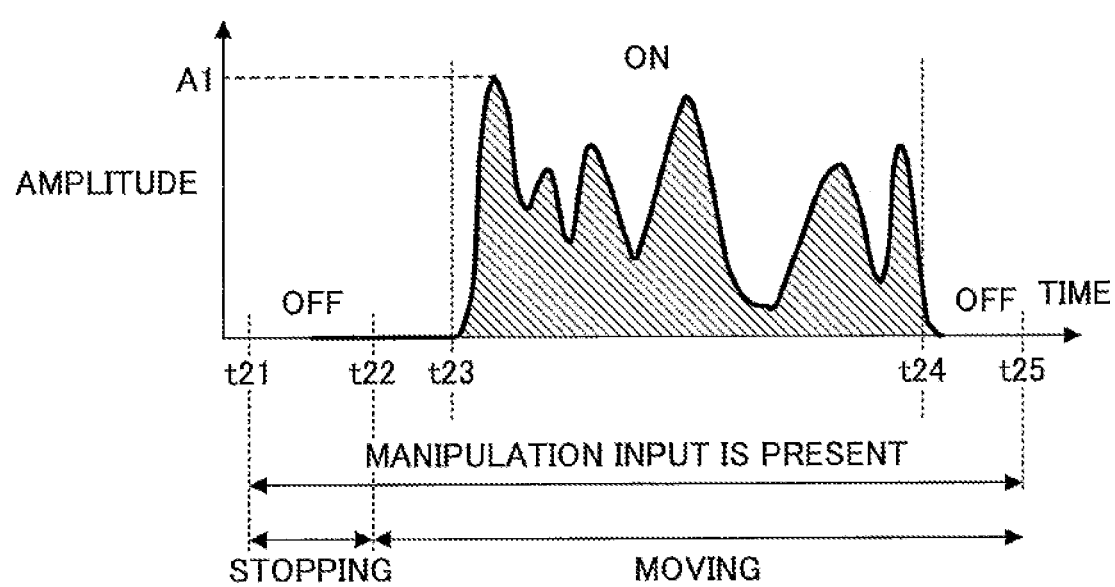
FIG. 13 is a diagram illustrating an example of an operation of the game controller according to the embodiment.

FIG. 13 is a diagram illustrating an example of an operation of the game controller 100 according to the embodiment. FIG. 13 illustrates driving patterns for driving the vibrating element 140 in accordance with the manipulation input illustrated in FIG. 12. In FIG. 13, a horizontal axis represents time, and a vertical axis represents an amplitude value of the amplitude data.

As illustrated in FIG. 12, the manipulation input is performed by the drag operation along an arrow on the surface of the top panel 120. It is supposed that the manipulation input is performed to move an object such as a vehicle or a man displayed on the display panel 510.

While the position of the manipulation input passes a designated zone S on the top panel 120, the drive controlling part 240 uses the amplitude data of which the amplitude temporally changes in a random manner to turn on the vibrating element 140.

When the vibrating element 140 is driven as described above, the kinetic friction force applied to the fingertip varies in accordance with the temporal change of the amplitude data. When the amplitude is large, the kinetic friction force is relatively small. When the amplitude is small, the kinetic friction force is relatively large.

Based on such a temporal variation of the kinetic friction force, a feel can be provided to the user's fingertip as if concave portions and convex portions having random heights were present on the surface of the top panel 120. The feel is provided to the user's fingertip as if the surface of the top panel 120 were rough.

For example, in a case where the object such as the vehicle or the man displayed on the display screen of the display panel 510 passes a zone having many obstacles, the vibrating element 140 may be driven by using the amplitude data of which the amplitude temporally changes in the random manner as described above.

The coordinates of the designated positions P1 and P2 in the top panel 120 can be calculated by calculating coordinates of an end point and a starting point of the zone S relative to the current position of the manipulation input of the top panel 120 based on data that represents a relative positional relationship between a current display position of the object displayed on the display screen of the display panel 510 and positions of an end point and a starting point of the zone having many obstacles displayed on the display screen.

For example, the vibrating element 140 may be driven by using the amplitude data using random numbers so that amplitude values are output in time series in order to temporally change the amplitude in the random manner. Such amplitude data may be stored in the memory 250 (see FIG. 6).

When the object moves in the display screen of the display panel 510 and passes the zone having many obstacles in accordance with the manipulation input of the user playing the video game with the game controller 100, the position of the manipulation input passes the zone S on the top panel 120.

Accordingly, when the object passes the zone having many obstacles in the display screen of the display panel 510, the drive controlling part 240 drives uses the amplitude data of which the amplitude temporally changes in the random manner to turn on the vibrating element 140. Thereby, the user can feel that the object has passed the zone having many obstacles through the tactile sensations.

The operation of the vibrating element 140 illustrated in FIG. 12 is described as follows with reference to FIG. 13.

When the manipulation input is performed at a time t21, the drive controlling part 240 outputs the amplitude data of which the amplitude value is zero and the vibrating element 140 is in an off-state.

The position of the manipulation input stops and does not move from the time t21 until a time t22. The vibrating element 140 is held in the off-state from the time t21 to the time t22.

When the position of the manipulation input starts to move at the time t22 and the position of the manipulation input reaches a starting point of the zone S (see FIG. 12) at a time t23, the drive controlling part 240 uses the amplitude data of which the amplitude temporally changes in the random manner to turn on the vibrating element 140.

The driving of the vibrating element 140 depending on the amplitude data of which the amplitude temporally changes in the random manner continues from the time t23 until the time t24. Then, the drive controlling part 240 turns off the vibrating element 140 at the time t24.

Because the kinetic friction coefficient applied to the user's fingertip is decreased by the squeeze film effect when the vibrating element 140 is turned on, the fingertip becomes easy to move over the surface of the top panel 120.

In the time period from the time t23 until the time t24, a feel can be provided to the user's fingertip as if the surface of the top panel 120 were rough because the drive controlling part 240 uses the amplitude data of which the amplitude temporally changes in the random manner.

After the vibrating element 140 is turned off at the time t24, the manipulation input is performed until the time t25 and the drive controlling part 240 sets the amplitude value of the amplitude data to zero.

Then, the manipulation input is stopped at the time t25.

In addition to the above described processes, the drive controlling part 240 may set the amplitude value in accordance with a temporal change degree of the position data.

Here, a moving speed of the user's fingertip tracing along the surface of the top panel 120 is used as the temporal change degree of the position data. The drive controlling part 240 may calculate the moving speed of the user's fingertip based on a temporal change degree of the position data input from the driver IC 151.

The higher the moving speed becomes, the smaller the game controller 100 controls the amplitude value to be, in order to make the tactile sensation sensed by the user constant regardless of the moving speed of the fingertip, for example. The lower the moving speed becomes, the greater the game controller 100 controls the amplitude value to be, in order to make the tactile sensation constant regardless of the moving speed of the fingertip, for example.

Data which represents a relationship between the amplitude data, representing the amplitude value, and the moving speed may be stored in the memory 250.

Although the amplitude value in accordance with the moving speed is set by using the data that represents the relationship between the amplitude data representing the amplitude value and the moving speed in the present embodiment, the amplitude value A may be calculated based on formula (3). The higher the moving speed becomes, the smaller the amplitude value A calculated by formula (3) becomes. The lower the moving speed becomes, the greater the amplitude value A calculated by formula (3) becomes.

$$A = A_0 / \sqrt{|V|/a} \quad (3)$$

"$A_0$" is a reference value of the amplitude, "V" represents the moving speed of the fingertip and "a" is a designated constant value. In a case where the amplitude value A is calculated by using formula (3), data representing formula (3) and data representing the reference value $A_0$ and the designated constant value a may be stored in the memory 250.

The drive controlling part 240 causes the vibrating element 140 to vibrate when the moving speed becomes greater than or equal to a designated threshold speed.

Accordingly, the amplitude value represented by the amplitude data output from the drive controlling part 240 becomes zero in a case where the moving speed is less than the designated threshold speed. The amplitude value is set to a designated amplitude value corresponding to the moving speed in a case where the moving speed is greater than or equal to the designated threshold speed. In a case where the moving speed is greater than or equal to the designated threshold speed, the higher the moving speed becomes, the smaller the amplitude value becomes. In a case where the moving speed is greater than or equal to the designated threshold speed, the lower the moving speed becomes, the greater the amplitude value becomes.

In a case where the moving speed of the fingertip is greater than or equal to the designated threshold speed, the drive controlling part 240 reads the amplitude data, which represents the amplitude value in accordance with the moving speed, from the memory 250 to output the amplitude data to the amplitude modulator 320.

FIG. 14 is a diagram illustrating the data which represents the relationship between the amplitude data representing the amplitude value and the moving speed stored in the memory 250.

According to the data as illustrated in FIG. 14, the amplitude value is set to 0 in a case where the moving speed V is greater than or equal to 0 and less than b1 (0<=V<b1), the amplitude value is set to A1 in a case where the moving speed V is greater than or equal to b1 and less than b2 (b1 <=V<b2), and the amplitude value is set to A2 in a case where the moving speed V is greater than or equal to b2 and less than b3 (b2 <=V<b3).

For example, the amplitude values of the driving patterns illustrated in FIGS. 8 and 11 may be set in accordance with the moving speed of the fingertip as the data illustrated in FIG. 14.

Because the kinetic friction force applied to the user's fingertip is varied by generating the natural vibration in the ultrasound-frequency-band of the top panel 120, the game controller 100 according to the embodiment can provide the fine tactile sensations to the user.

The game controller 100 of the embodiment generates the driving signal by causing the amplitude modulator 320 to modulate only the amplitude of the sinusoidal wave in the ultrasound-frequency-band output from the sinusoidal wave generator 310. The frequency of the sinusoidal wave in the ultrasound-frequency-band generated by the sinusoidal wave generator 310 is equal to the natural vibration frequency of the top panel 120. The natural vibration frequency is set in consideration of the vibrating element 140.

The driving signal is generated by the amplitude modulator 320 modulating only the amplitude of the sinusoidal wave in the ultrasound-frequency-band generated by the sinusoidal wave generator 310 without modulating the frequency or the phase of the sinusoidal wave.

Accordingly, it becomes possible to generate the natural vibration of the top panel 120 in the ultrasound-frequency-band in the top panel 120 and to reduce the kinetic friction coefficient applied to the fingertip tracing the top panel 120 with absolute certainty by utilizing the layer of air provided by the squeeze film effect. It becomes possible to provide fine tactile sensations to the user as if the concave portion and the convex portion were present on the surface of the top panel 120 by utilizing the Sticky-band Illusion effect or the Fishbone Tactile Illusion effect.

In the embodiment as described above, in order to provide the tactile sensations to the user as if the concave portions and the convex portions were present on the top panel 120, the vibrating element 140 is switched on or off. Turning off the vibrating element 140 is equal to setting the amplitude value represented by the driving signal used to drive the vibrating element 140 to zero.

However, it is not necessary to turn off the vibrating element 140 from a being turned on state. For example, the vibrating element 140 may be driven based on the drive signal having a small amplitude instead of turning off the vibrating element 140. For example, the game controller 100 may provide the tactile sensations as if the concave portion and the convex portion were present on the surface of the top panel 120 to the user by reducing the amplitude to about one-fifth of that of the turned on state.

In this case, the vibrating element 140 is driven by the drive signal in a manner that the vibration of the vibrating element 140 is switched between a strong level and a weak level. As a result, the strength of the natural vibration generated in the top panel 120 is switched between the strong level and the weak level. It becomes possible to provide the tactile sensations as if the concave portion and the convex portion were present on the surface of the top panel 120 to the user's fingertip.

If the game controller 100 turns off the vibrating element 140 when making the vibration weaker in order to switch the vibration of the vibrating element 140 from the strong level to the weak level, the vibrating element 140 is switched off. Switching on and off the vibrating element 140 means driving the vibrating element 140 intermittently.

When the tactile sensations as if the concave portion and the convex portion were present on the top panel 120, a degree of decreasing the amplitude value of the amplitude data may be adjusted in accordance with the moving speed of the fingertip.

Figure 15:
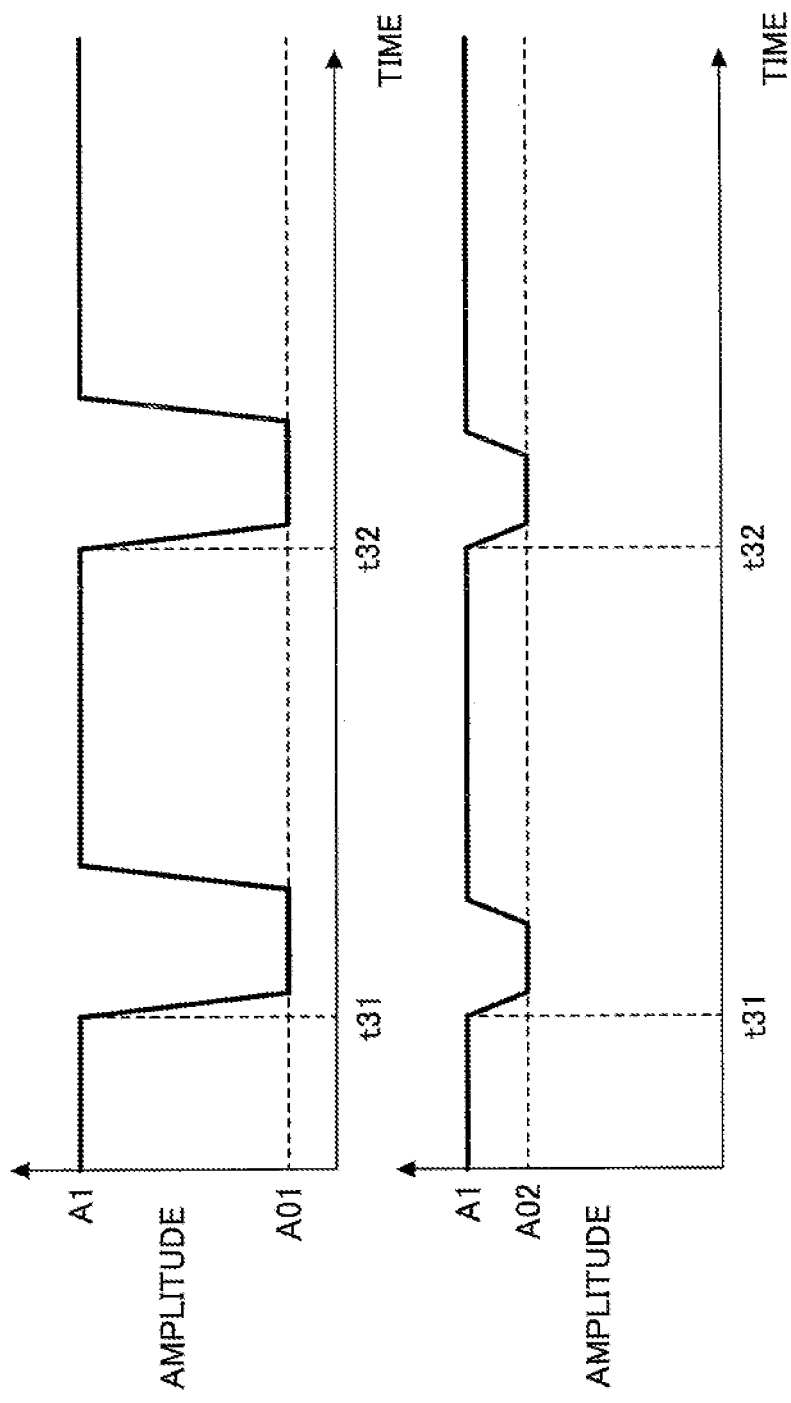
FIG. 15A is a diagram illustrating driving patterns for adjusting the degree of decreasing the amplitude value of the amplitude data in accordance with the moving speed of a fingertip.
FIG. 15B is a diagram illustrating driving patterns for adjusting the degree of decreasing the amplitude value of the amplitude data in accordance with the moving speed of the fingertip.

FIGS. 15A and 15B are diagrams illustrating driving patterns for adjusting the degree of decreasing the amplitude value of the amplitude data in accordance with the moving speed of the fingertip.

When decreasing the amplitude value in order to increase the kinetic friction force applied to the fingertip, the driving patterns illustrated in FIG. 15A decrease, at a time t31 and a time t32, the amplitude value to A01 from a state where the amplitude value is set to A1 and the vibrating element 140 is turned on. For example, the amplitude value A01 is one-fifth of the amplitude value A1.

In contrast, when decreasing the amplitude value in order to increase the kinetic friction force applied to the fingertip, the driving patterns illustrated in FIG. 15B decrease, at the time t31 and the time t32, the amplitude value to A02 from a state where the amplitude value is set to A1 and the vibrating element 140 is turned on. For example, the amplitude value A02 is four-fifths of the amplitude value A1.

For example, in a case where the moving speed is higher than the designated value, the driving patterns of FIG. 15A are used to decrease the amplitude value to A01 when the amplitude value is decreased in order to increase the kinetic friction force applied to the fingertip because there is a tendency that the fingertip is easy to feel the concavo-convex tactile sensations when the moving speed is high.

In a case where the moving speed is equal to or less than the designated value, the driving patterns of FIG. 15B are used to decrease the amplitude value to A02 when the amplitude value is decreased in order to increase the kinetic friction force applied to the fingertip.

Tactile sensations different in accordance with the moving speed of the fingertip can be provided to the user by adjusting the amplitude value of the amplitude data in accordance with the moving speed of the fingertip as described above.

Although the game controller 100 includes the two touch panels 150 as illustrated in FIG. 1, the number of touch panels 150 may be one.

Figure 16:
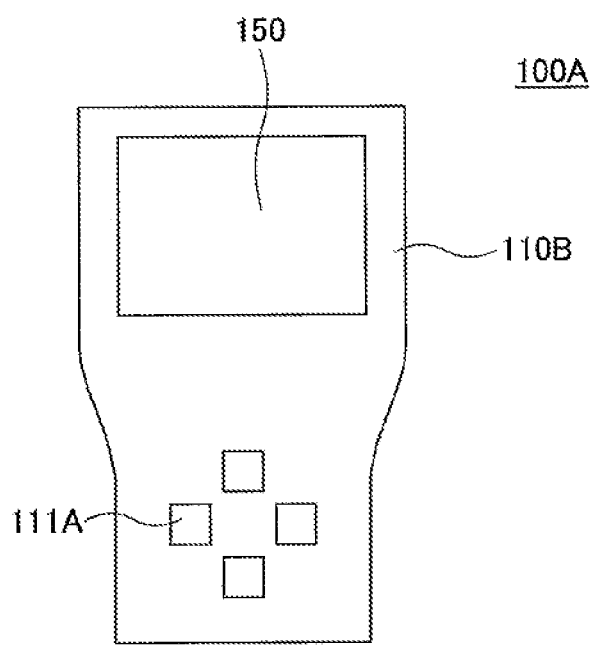
FIG. 16 is a diagram illustrating a game controller according to a variation example of the embodiment.

FIG. 16 is a diagram illustrating a game controller 100A of a variation example of the embodiment. The game controller 100A includes one touch panel 150 disposed on an opening portion of a housing 110B. A button 111A is also disposed on the housing 110A. The housing 110B is vertically long. The user may hold a lower side in FIG. 16 with one hand and manipulate the touch panel 150 disposed on an upper side with the other hand. The game controller 100A has a shape particularly suitable for manipulation with an index finger of the other hand.

Although examples of a game controller according to the embodiment of the present invention have been described, the present invention is not limited to the embodiment specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the sprit and scope of the invention.

What is claimed is:

1. A game controller comprising:
   a housing having an opening portion;
   a top panel disposed on the opening portion and having a manipulation input surface;
   a position detector configured to detect a position of a manipulation input performed on the manipulation input surface of the top panel;
   a vibrating element configured to generate a vibration in the manipulation input surface of the top panel; and
   a drive controlling part configured to drive the vibrating element with a driving signal causing the vibrating element to generate a natural vibration in an ultrasound-frequency-band in the manipulation input surface of the top panel;
   wherein the drive controlling part is configured to
   turn on, in response to a start of the manipulation input performed on the manipulation input surface, the vibrating element with the driving signal to set the vibrating element in an ON state,
   continuously hold the vibrating element in the ON state until the position of the manipulation input starts moving from a starting point on the manipulation input surface,
   turn off the vibrating element with the driving signal to change the ON state of the vibrating element to an OFF state upon a movement amount of the position of the manipulation input on the manipulation input surface from the starting point reaching a predetermined distance from the starting point, and
   turn on, upon the OFF state of the vibrating element being continued over a predetermined period of time, the vibrating element with the driving signal to set the vibrating element in the ON state again.

2. The game controller as claimed in claim 1, wherein the drive controlling part drives the vibrating element so as to vary an intensity of the natural vibration in accordance with the position of the manipulation input performed on the manipulation input surface and a temporal change degree of the position.

3. The game controller as claimed in claim 1, wherein the drive controlling part drives the vibrating element so as to vary an intensity of the natural vibration when the position of the manipulation input passes a designated position corresponding to a position in a content displayed based on image data of a game.

4. The game controller as claimed in claim 1, wherein the driving signal causes the vibrating element to generate the natural vibration in the ultrasound-frequency-band in the manipulation input surface, the natural vibration having a constant frequency and a constant phase.

5. The game controller as claimed in claim 1,
wherein the manipulation input surface has a rectangular shape having long sides and short sides in plan view, and
wherein the drive controlling part causes the vibrating element to vibrate so that a standing wave of which amplitude varies along the long side occurs on the manipulation input surface.

\* \* \* \* \*